United States Patent
Yu et al.

(10) Patent No.: US 9,942,782 B2
(45) Date of Patent: Apr. 10, 2018

(54) METHOD AND APPARATUS FOR SUPPORTING MOBILE STATION DISCONNECTED FROM A BASE STATION IN WIRELESS COMMUNICATION SYSTEM

(75) Inventors: Hyun-Kyu Yu, Yongin-si (KR); Chi-Woo Lim, Suwon-si (KR); Su-Ryong Jeong, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 534 days.

(21) Appl. No.: 13/360,448

(22) Filed: Jan. 27, 2012

(65) Prior Publication Data

US 2012/0196561 A1    Aug. 2, 2012

(30) Foreign Application Priority Data

Jan. 28, 2011  (KR) .................. 10-2011-0008608

(51) Int. Cl.
| | |
|---|---|
| H04W 4/00 | (2009.01) |
| H04B 7/15 | (2006.01) |
| H04W 24/04 | (2009.01) |
| H04W 4/22 | (2009.01) |
| H04W 76/02 | (2009.01) |
| H04W 36/14 | (2009.01) |
| H04W 84/20 | (2009.01) |
| H04W 88/04 | (2009.01) |

(52) U.S. Cl.
CPC ............. *H04W 24/04* (2013.01); *H04W 4/22* (2013.01); *H04W 76/028* (2013.01); *H04W 36/14* (2013.01); *H04W 84/20* (2013.01); *H04W 88/04* (2013.01)

(58) Field of Classification Search
CPC ....... H04W 4/22; H04W 40/00–40/38; H04W 4/008; H04W 4/20
USPC .... 455/11.1, 13.1; 370/310.2, 316, 328, 338
See application file for complete search history.

(56) References Cited

U.S. PATENT DOCUMENTS

| | | | | |
|---|---|---|---|---|
| 2004/0242154 | A1* | 12/2004 | Takeda et al. ................... | 455/16 |
| 2007/0149118 | A1* | 6/2007 | Kang ................... | H04B 7/2606 455/11.1 |
| 2007/0153758 | A1* | 7/2007 | Kang ................... | H04B 7/2606 370/338 |

(Continued)

FOREIGN PATENT DOCUMENTS

| | | |
|---|---|---|
| KR | 1020090123862 | 12/2009 |
| KR | 1020100011063 | 2/2010 |

(Continued)

OTHER PUBLICATIONS

Notice of Preliminary Rejection dated Oct. 20, 2016 in connection with Korean Application No. 10-2011-0008608, 11 pages.

(Continued)

*Primary Examiner* — San Htun

(57) ABSTRACT

A method and apparatus support a Mobile Station (MS) located in a collapsed cell area to be disconnected from a Base Station (BS) in a wireless communication system. A method of an MS for supporting an disconnected MS disconnected from a BS in a wireless communication system includes receiving a rescue signal from the disconnected MS; collecting information to determine a support MS for the disconnected MS; and transmitting the collected information to a serving BS.

2 Claims, 13 Drawing Sheets

(56) References Cited

U.S. PATENT DOCUMENTS

| | | | |
|---|---|---|---|
| 2007/0206531 A1* | 9/2007 | Pajukoski | H04W 74/0866 370/329 |
| 2008/0107062 A1* | 5/2008 | Viorel | H04L 27/2602 370/315 |
| 2008/0165748 A1* | 7/2008 | Visotsky et al. | 370/338 |
| 2008/0212512 A1* | 9/2008 | Harpek et al. | 370/315 |
| 2008/0291884 A1* | 11/2008 | Lee et al. | 370/338 |
| 2009/0003261 A1* | 1/2009 | Kim | H04B 7/2606 370/315 |
| 2009/0221283 A1* | 9/2009 | Soliman | H04W 48/14 455/426.1 |
| 2009/0247072 A1* | 10/2009 | Nakamura | H04B 7/15557 455/11.1 |
| 2010/0110983 A1* | 5/2010 | Fu | H04J 11/0056 370/328 |
| 2010/0120392 A1 | 5/2010 | Youn et al. | |
| 2010/0142436 A1* | 6/2010 | Hart | H04B 7/15507 370/315 |
| 2010/0323614 A1* | 12/2010 | Yu | H04B 7/155 455/9 |
| 2011/0110258 A1* | 5/2011 | Ishii et al. | 370/252 |
| 2011/0124312 A1 | 5/2011 | Kwon et al. | |
| 2011/0194432 A1* | 8/2011 | Kato | H04W 74/002 370/252 |

FOREIGN PATENT DOCUMENTS

| | | | |
|---|---|---|---|
| WO | 2009157124 A1 | 12/2009 | |
| WO | WO 2009154102 A1 * | 12/2009 | H04W 74/002 |

OTHER PUBLICATIONS

Foreign Communication from Related Counterpart Application, Korean Patent Application No. 10-2011-0008608, Notice of Patent Grant dated Jun. 22, 2017, 4 pages.

* cited by examiner

METHOD AND APPARATUS FOR SUPPORTING MOBILE STATION DISCONNECTED FROM A BASE STATION IN WIRELESS COMMUNICATION SYSTEM

CROSS-REFERENCE TO RELATED APPLICATION(S) AND CLAIM OF PRIORITY

The present application is related to and claims priority under 35 U.S.C. § 119 to an application filed in the Korean Intellectual Property Office on Jan. 28, 2011 and assigned Serial No. 10-2011-0008608, the contents of which are incorporated herein by reference.

TECHNICAL FIELD OF THE INVENTION

The present disclosure relates generally to a wireless communication system, and in particular, to a method and apparatus for supporting a Mobile Station (MS) located in a collapsed cell area in a wireless communication system.

BACKGROUND OF THE INVENTION

In preparation for an emergency state such as a disaster, a wireless communication system provides a service for notifying that a user is in an emergency state. For example, the wireless communication system provides an emergency call service for transmitting, when a user is in an emergency state, an emergency signal to request the assistance of relevant agencies or other users.

However, a Base Station (BS) may malfunction due to disasters such as earthquakes, fires, and terrors. In this case, a cell area of the BS may collapse, and Mobile Stations (MSs) in the collapsed cell area may be disconnected from the BS to fail to receive the emergency call service.

What is therefore required is a scheme for supporting an emergency call service for MSs that are disconnected from a BS due to the collapse of a cell area of the BS.

SUMMARY OF THE INVENTION

To address the above-discussed deficiencies of the prior art, it is a primary object to provide a method and apparatus for supporting a Mobile Station (MS) located in a collapsed cell area to be disconnected from a Base Station (BS) in a wireless communication system.

Another object of the present disclosure is to provide a method and apparatus for relaying, by a normal MS located in a normal cell area, a signal of a MS located in a collapsed cell area to be disconnected from a BS in a wireless communication system.

Another object of the present disclosure is to provide a method and apparatus for operating a normal MS, which is located in a normal cell area, as a master MS for an MS, which is located in a collapsed cell area to be disconnected from a BS, to connect the disconnected MS and the BS in a wireless communication system.

Another object of the present disclosure is to provide a method and apparatus for determining, by a BS, a master MS for supporting an MS located in a collapsed cell area to be disconnected from a BS in a wireless communication system.

Another object of the present disclosure is to provide a method and apparatus for selecting a master MS by an MS located in a collapsed cell area to be disconnected from a BS in a wireless communication system.

According to an aspect of the present disclosure, a method of an Mobile Station (MS) for supporting an MS disconnected from a Base Station (BS) in a wireless communication system includes: receiving a rescue signal from the disconnected MS; collecting information necessary to determine a support MS for the disconnected MS; and transmitting the collected information to a serving BS.

According to another aspect of the present disclosure, a method of a Base Station (BS) for supporting a Mobile Station (MS) disconnected from a BS in a wireless communication system includes: receiving information, which is necessary to determine a support MS for the disconnected MS, from at least one MS in a cell; determining a support MS for the disconnected MS on the basis of the received information; and transmitting a support command signal for the disconnected MS to the support MS.

According to another aspect of the present disclosure, a method of a Mobile Station (MS) disconnected from a Base Station (BS) in a wireless communication system includes: transmitting a rescue signal when a preamble signal is not received from a BS; receiving a preamble signal from at least one adjacent MS; determining a support MS on the basis of the received (RX) strength of the preamble signal received from the adjacent MS; and attempting a connection to the support MS.

According to another aspect of the present disclosure, an apparatus of a Mobile Station (MS) for supporting an MS disconnected from a Base Station (BS) in a wireless communication system includes: a receiving unit for receiving a rescue signal from the disconnected MS; a control unit for collecting information necessary to determine a support MS for the disconnected MS; and a transmitting unit for transmitting the collected information to a serving BS.

According to another aspect of the present disclosure, an apparatus of a Base Station (BS) for supporting a Mobile Station (MS) disconnected from a BS in a wireless communication system includes: a receiving unit for receiving information, which is necessary to determine a support MS for the disconnected MS, from at least one MS in a cell; a control unit for determining a support MS for the disconnected MS on the basis of the received information; and a transmitting unit for transmitting a support command signal for the disconnected MS to the support MS.

According to another aspect of the present disclosure, an apparatus of a Mobile Station (MS) disconnected from a Base Station (BS) in a wireless communication system includes: a transmitting unit for transmitting a rescue signal when a preamble signal is not received from a BS; a receiving unit for receiving a preamble signal from at least one adjacent MS; and a control unit for determining a support MS on the basis of the received (RX) strength of the preamble signal received from the adjacent MS, and attempting a connection to the support MS.

BRIEF DESCRIPTION OF THE DRAWINGS

The above and other objects, features and advantages of the present disclosure will become more apparent from the following detailed description when taken in conjunction with the accompanying drawings in which.

DETAILED DESCRIPTION OF THE INVENTION

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication system. Exemplary embodiments of the present disclosure will be described herein below with reference to the accompanying drawings. In the following description, detailed descriptions of well-known functions or configurations will be omitted since they would unnecessarily obscure the subject matters of the present disclosure. Also, the terms used herein are defined according to the functions of the present disclosure. Thus, the terms may vary depending on users' or operators' intentions or practices. Therefore, the terms used herein must be understood based on the descriptions made herein.

The present disclosure provides a method and apparatus for supporting a Mobile Station (MS) located in a collapsed cell area in a wireless communication system.

Figure 1:
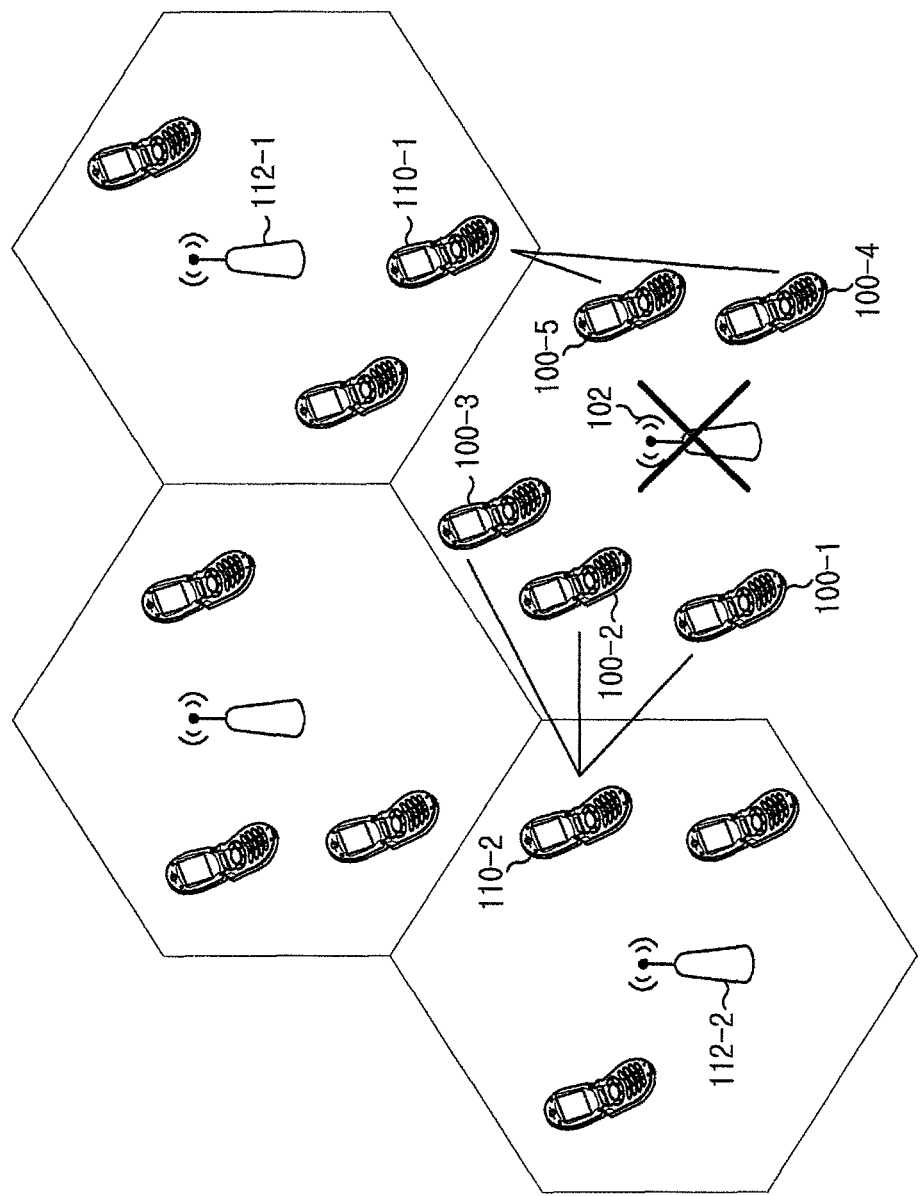
FIG. 1 illustrates a system configuration for supporting an MS disconnected from a BS in a wireless communication system according to an exemplary embodiment of the present disclosure.

FIG. 1 illustrates a system configuration for supporting an MS disconnected from a BS in a wireless communication system according to an exemplary embodiment of the present disclosure.

Referring to FIG. 1, the present disclosure will be described on the assumption that a cell area of a Base Station (BS) 102 collapses because the BS 102 fails to operate normally due to a failure. Also, the present disclosure will be described on the assumption that when a cell area of the BS 102 collapses due to a failure, MSs 100-1 to 100-5, which have received a service from the BS 102, fail to receive signals from any other BSs and are disconnected from any BSs.

The MSs 100-1 to 100-5 disconnected from the BS (hereinafter referred to as "disconnected MS" or "disconnected MSs") transmit rescue signals in order to escape the state of disconnection from the BS. Upon receiving the rescue signals, mobiles stations 110-1 and 110-2 located in a normal cell area function as a master MS for the disconnected MSs 100-1 to 100-5 to transmit signals of the disconnected MSs 100-1 to 100-5 to serving BSs 112-1 and 112-2 and to transmit signals of the serving BSs 112-1 and 112-2 to the disconnected MSs 100-1 to 100-5. Herein, the master MS may be determined by each of the disconnected MSs or by the relevant BS. Hereinafter, a detailed description will be give of three exemplary embodiments of a scheme for determining the master MS and supporting the disconnected MSs.

Figure 2:
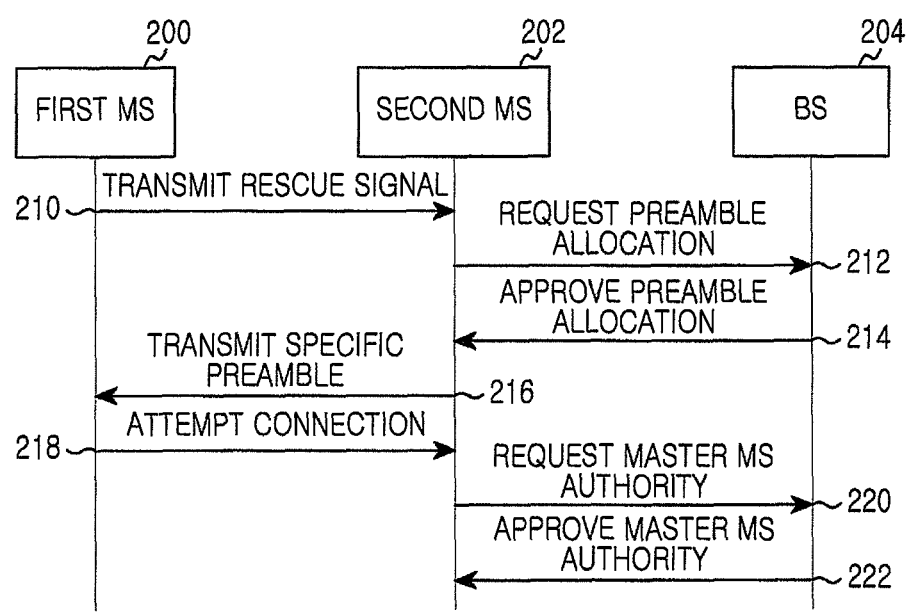
FIG. 2 illustrates a signal flow for supporting an MS disconnected from a BS in a wireless communication system according to an exemplary embodiment of the present disclosure.

FIG. 2 illustrates a signal flow for supporting an MS disconnected from a BS in a wireless communication system according to an exemplary embodiment of the present disclosure. In FIG. 2, a first MS 200 is a disconnected MS that is located in a collapsed cell area to be disconnected from a BS. A second MS 202 is a normal MS that is located in a cell area supporting a normal service. A BS 204 is a serving BS that provides a service to the second MS 202.

Referring to FIG. 2, when a preamble signal is detected, the first MS 200 transmits a rescue signal in step 210. Herein, the preamble signal may be a preamble signal of a BS or a preamble signal of a master MS. When the preamble signal is detected, the first MS 200 attempts a connection to an MS or a BS corresponding to the detected preamble signal, without performing the process of FIG. 2.

Upon receiving the rescue signal, the second MS 202 transmits a preamble allocation request to the BS 204 in step 212. In step 214, the BS 204 determines a preamble for the second MS 202 and transmits a preamble allocation approval signal including the determined preamble information (e.g., preamble index) to the second MS 202.

In step 216, the second MS 202 transmits the allocated preamble to the first MS 200 at predetermined periods. In this case, the second MS 202 may stop an operation of detecting a rescue signal transmitted by the disconnected MS.

Upon receiving the preamble from the second MS 202, the first MS 200 determines whether to determine the second MS 202 as the first MS 200 own master MS on the basis of the received (RX) strength of the preamble signal. For example, when the RX strength of the preamble signal received from the second MS 202 is equal to or greater than a predetermined threshold value, the first MS 200 may determine the second MS 202 as the first MS 200 own master MS. Also, when receiving preambles from a plurality of MSs, the first MS 200 may determine the MS corresponding to the preamble of the greatest RX strength as the first MS 200 own MS. When determining the second MS 202 as the first MS 200 own master MS, the first MS 200 attempts a connection to the second MS 202 in step 218.

Upon detecting the connection attempt of the first MS 200, the second MS 202 transmits a master MS authority request to the BS 204 in step 220. In step 222, the BS 204 transmits a master MS authority approval signal to the second MS 202.

Upon receiving the master MS authority from the BS 204, the second MS 202 may establish a communication link with the first MS 200 to transmit a signal of the first MS 200 to the BS 204 and to transmit a signal of the BS 204 to the first MS 200.

Hereinafter, an operation process of a disconnected MS, an operation process of a normal MS, and an operation process of a serving BS of the normal MS will be described with reference to FIGS. 3 to 5 based on the signal flow of FIG. 2.

Figure 3:
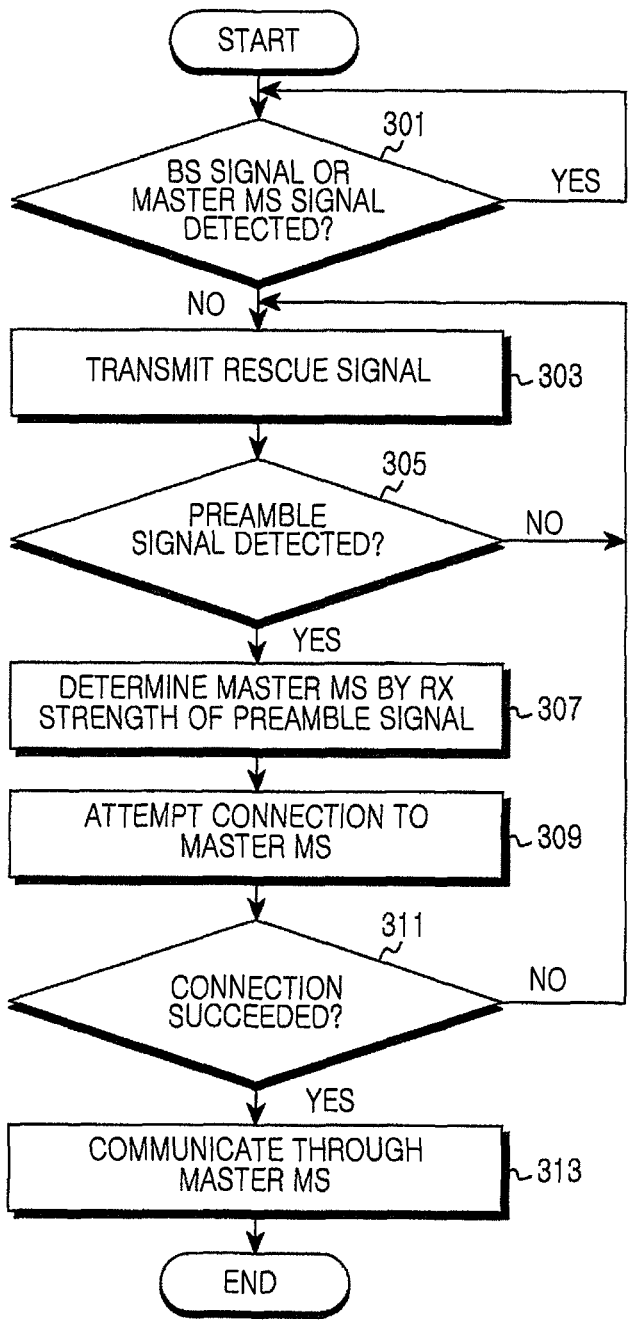
FIG. 3 illustrates an operation process of an MS disconnected from a BS in a wireless communication system according to an exemplary embodiment of the present disclosure.

FIG. 3 illustrates an operation process of a MS disconnected from a BS in a wireless communication system according to an exemplary embodiment of the present disclosure.

Referring to FIG. 3, in step 301, the disconnected MS determines whether a preamble of a BS or a preamble signal of a master MS is detected.

When a preamble of the BS or a preamble signal of the master MS is not detected, the disconnected MS proceeds to step 303. In step 303, the disconnected MS determines that is located in a collapsed cell area or is located outside a cell area to be in a disconnected state, and transmits a rescue signal. Herein, the rescue signal may be broadcasted.

In step 305, the disconnected MS determines whether a preamble signal is detected. When the preamble signal is not detected, the disconnected MS returns to step 303 to transmit a rescue signal. That is, the disconnected MS continues to transmit the rescue signal until receiving a preamble of the BS or a preamble signal of the master MS When the preamble is received, the disconnected MS proceeds to step 307. In step 307, the disconnected MS determines its own master MS based on the RX strength of the preamble signal. For example, when the RX strength of the preamble signal is equal to or greater than a predetermined threshold value, the disconnected MS may determine the MS corresponding to the preamble as the disconnected MS's own master MS. On the other hand, when the RX strength of the preamble signal is smaller than the predetermined threshold value, the disconnected MS may disregard the received preamble and return to step 303 to transmit a rescue signal. Also, when receiving preambles from a plurality of MSs, the disconnected MS may compare the RX strengths of the preamble signals and determine the MS corresponding to the preamble of the greatest RX strength as the disconnected MS's own master MS.

In step 309, the disconnected MS attempts a connection to the master MS. In step 311, the disconnected MS determines whether the connection to the master MS succeeds. When the connection to the master MS fails, the disconnected MS return to step 303 to transmit an SOS signal.

When the connection to the master MS succeeds, the disconnected MS proceeds to step 313. In step 313, the disconnected MS communicates through the master MS. Thereafter, the disconnected MS ends the algorithm according to the present disclosure.

Figure 4:
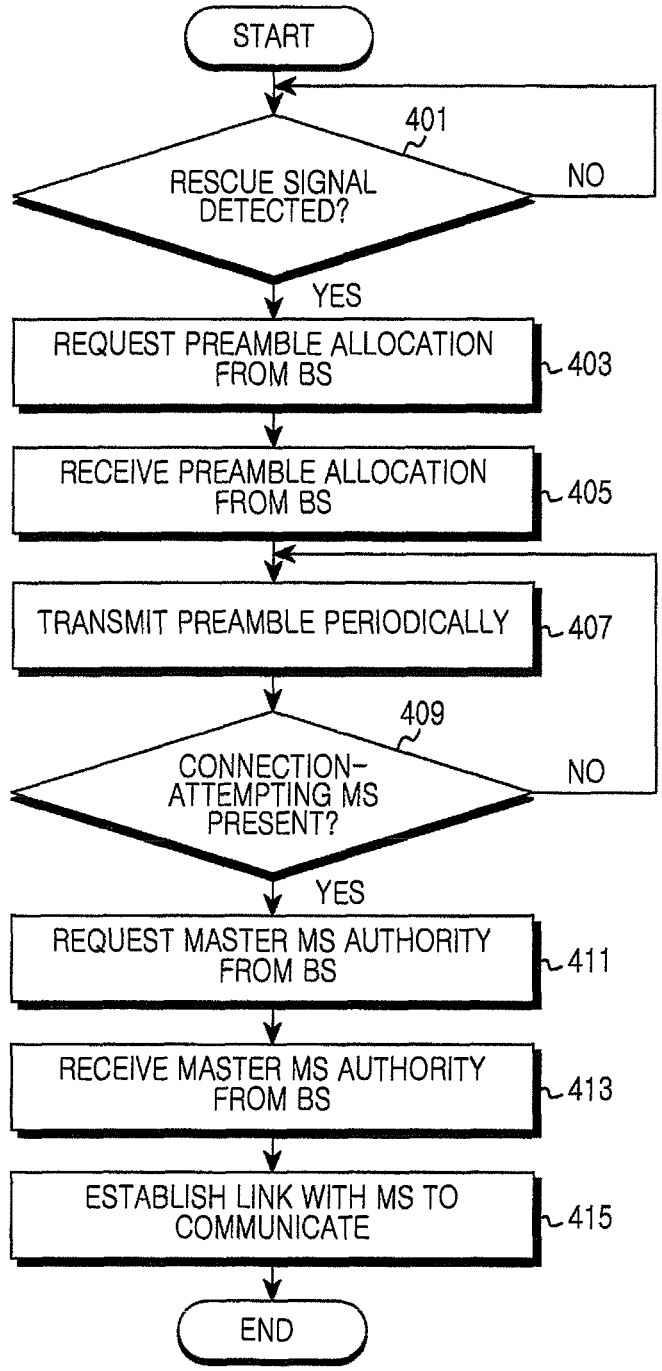
FIG. 4 illustrates an operation process of an MS located in a normal area in a wireless communication system according to an exemplary embodiment of the present disclosure.

FIG. 4 illustrates an operation process of an MS located in a normal area in a wireless communication system according to an exemplary embodiment of the present disclosure.

Referring to FIG. 4, in step 401, the MS located in the normal area (hereinafter referred to as "normal MS") determines whether a rescue signal is detected. When the rescue signal is detected, the normal MS determines that there is a peripheral MS in a disconnected state. In step 403, the normal MS transmits a preamble allocation request to the normal MS's own serving BS.

In step 405, the normal MS receives a preamble allocation from the serving BS. In step 407, the normal MS transmits a preamble periodically.

In step 409, the normal MS determines whether there is an MS attempting a connection to the normal MS. When there is no MS attempting a connection to the normal MS, the normal MS returns to step 407 to transmit a preamble periodically. Although not illustrated in FIG. 4, when a connection-attempting MS is not present for a predetermined period of time, the normal MS may stop the preamble transmitting operation and end the algorithm according to the present disclosure.

When there is a connection-attempting MS, the normal MS proceeds to step 411. In step 411, the normal MS transmits a master MS authority request to the serving BS. In step 413, the normal MS receives a master MS authority approval signal from the serving BS.

Thereafter, the normal MS functions as a master MS for the connection-attempting MS. In step 415, the normal MS establishes a communication link with the connection-attempting MS to perform communication. That is, the normal MS may transmit a signal of a disconnected MS, which has connected to the normal MS, to the serving BS, and transmit a signal of the serving BS to the disconnected MS.

Thereafter, the normal MS ends the algorithm according to the present disclosure.

Figure 5:
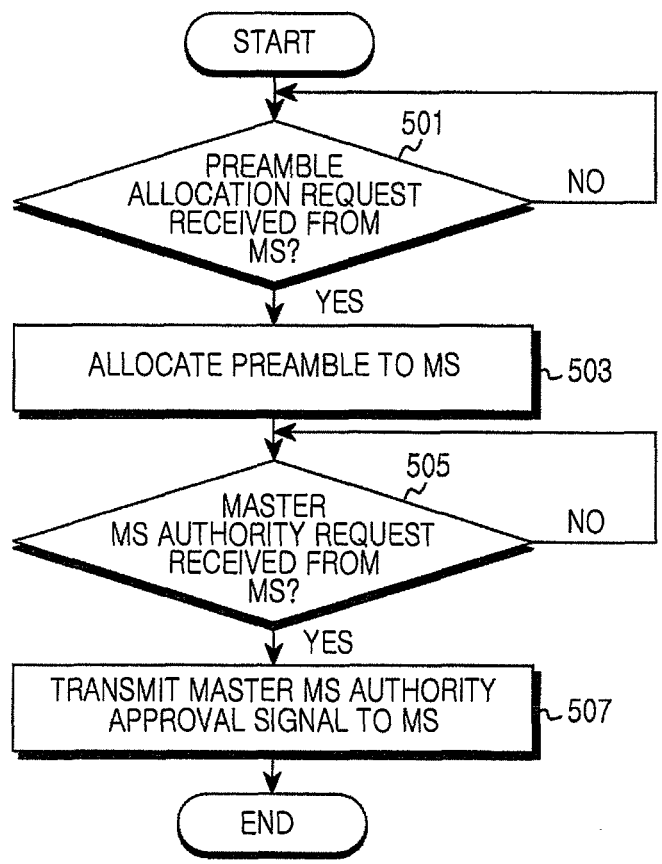
FIG. 5 illustrates an operation process of a BS for supporting an MS disconnected from a BS in a wireless communication system according to an exemplary embodiment of the present disclosure.

FIG. 5 illustrates an operation process of a BS for supporting an MS disconnected from a BS in a wireless communication system according to an exemplary embodiment of the present disclosure.

Referring to FIG. 5, in step 501, the BS determines whether a preamble allocation request signal is received from an MS within the BS's cell.

When the preamble allocation request signal is received, the BS proceeds to step 503. In step 503, the BS determines a preamble to be allocated to the MS and transmits the determined preamble information to the MS.

In step 505, the BS determines whether a master MS authority request signal is received from the MS. When the master MS authority request signal is received, the BS proceeds to step 507. In step 507, the BS transmits a master MS authority approval signal to the MS.

Thereafter, the BS ends the algorithm according to the present disclosure.

As described with reference to FIGS. 2 to 5, the disconnected MS determines its own master MS in an exemplary embodiment of the present disclosure. Accordingly, it is possible for the disconnected MS to determine an MS having the best downlink channel environment as the disconnected MS's own master MS.

Figure 6:
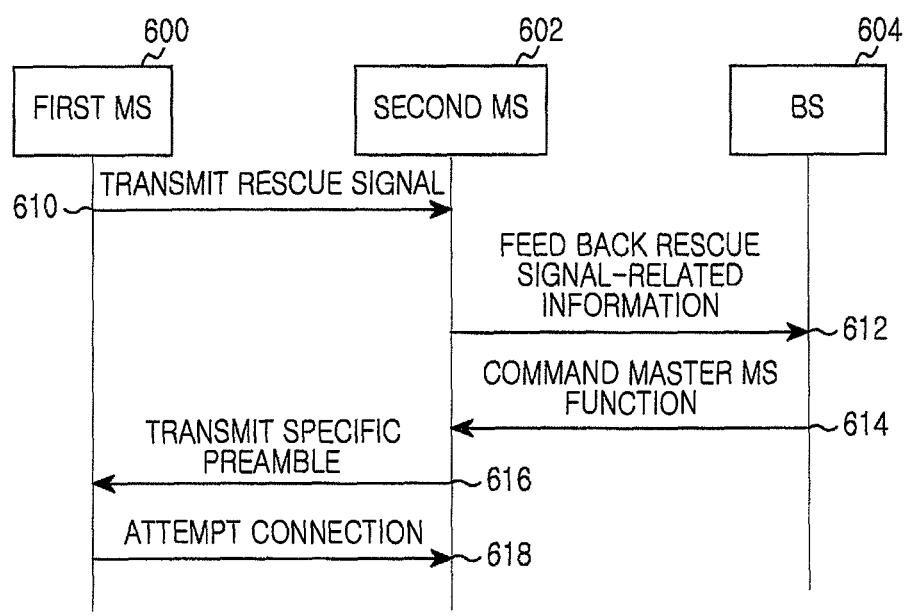
FIG. 6 illustrates a signal flow for supporting an MS disconnected from a BS in a wireless communication system according to another exemplary embodiment of the present disclosure.

FIG. 6 illustrates a signal flow for supporting an MS disconnected from a BS in a wireless communication system according to another exemplary embodiment of the present disclosure. In FIG. 6, a first MS 600 is a disconnected MS that is located in a collapsed cell area to be disconnected from a BS. A second MS 602 is a normal MS that is located in a cell area supporting a normal service. A BS 604 is a serving BS that provides a service to the second MS 602.

Referring to FIG. 6, when a preamble signal is not detected, the first MS 600 transmits a rescue signal in step 610. Herein, the preamble signal may be a preamble signal of a BS or a preamble signal of a master MS. When the preamble signal is detected, the first MS 600 attempts a connection to an MS or a BS corresponding to the detected preamble signal, without perforating the process of FIG. 6.

Upon receiving the rescue signal, the second MS 602 transmits information related to the rescue signal to the second MS 602 serving BS 604 in step 612. Herein, the rescue signal-related information may include information about the residual power of the second MS 602, information about the reception/non-reception of a rescue signal, information about the number of received rescue signals, information about the strength of a received rescue signal, and information about the location of the second MS 602.

Upon receiving the rescue signal-related information, the serving BS 604 determines a master MS for disconnected MSs based on the received information. When receiving rescue signal-related information from a plurality of MSs within the serving BS's 604 cell, the serving BS 604 uses the received information to select at least one MS suitable for supporting a disconnected MS, among the MSs transmitting the rescue signal-related information, and determines the selected MS as a master MS. Herein, the serving BS may restrict the number of master MSs to prevent an excessive number of master MSs from being set in the cell, thereby making it possible to prevent a degradation in the overall system performance. That is, the serving BS may determine the maximum number of master MSs. The maximum number of master MSs may be predetermined by a service provider and a designer, or may be changed dynamically according to the cell states.

When the second MS 602 is determined as a master MS, the serving BS 604 transmits a master MS function command signal to the second MS 602 in step 614. Herein, the serving BS 604 may allocate a preamble to the second MS 604. On the other hand, when the second MS 602 is not determined as a master MS, the serving BS 604 may not transmit any signal or may transmit a signal indicating that the second MS 602 is not determined as a master MS.

In step 616, the second MS 602 transmits the allocated preamble to the first MS 600 at predetermined periods. In this case, the second MS 602 may stop an operation of detecting a rescue signal transmitted by the disconnected MS.

Upon receiving the preamble from the second MS 602, the first MS 600 determines whether to determine the second MS 602 as the first MS's 600 own master MS based on the RX strength of the preamble signal. For example, when the RX strength of the preamble signal received from the second MS 602 is equal to or greater than a predetermined threshold value, the first MS 600 may determine the second MS 602 as the first MS's 600 own master MS. On the other hand, when the RX strength of the preamble signal is smaller than the predetermined threshold value, the first MS 600 may return to step 610 to transmit a rescue signal.

When the first MS 600 determines the second MS 602 as the first MS 600 own master MS, the first MS 600 attempts a connection to the second MS 602 in step 618. Then, the second MS 602 may set a communication link with the first MS 600 to transmit a signal, of the first MS 600 to the serving BS 604 and to transmit a signal of the serving BS 604 to the first MS 600.

Hereinafter, an operation process of a normal MS and an operation process of a serving BS of the normal MS will be described with reference to FIGS. 7 and 8 based on the signal flow of FIG. 6. An operation of a disconnected MS in FIG. 6 may be performed similarly to the process described in FIG. 3, and thus a description thereof will be omitted for conciseness.

Figure 7:
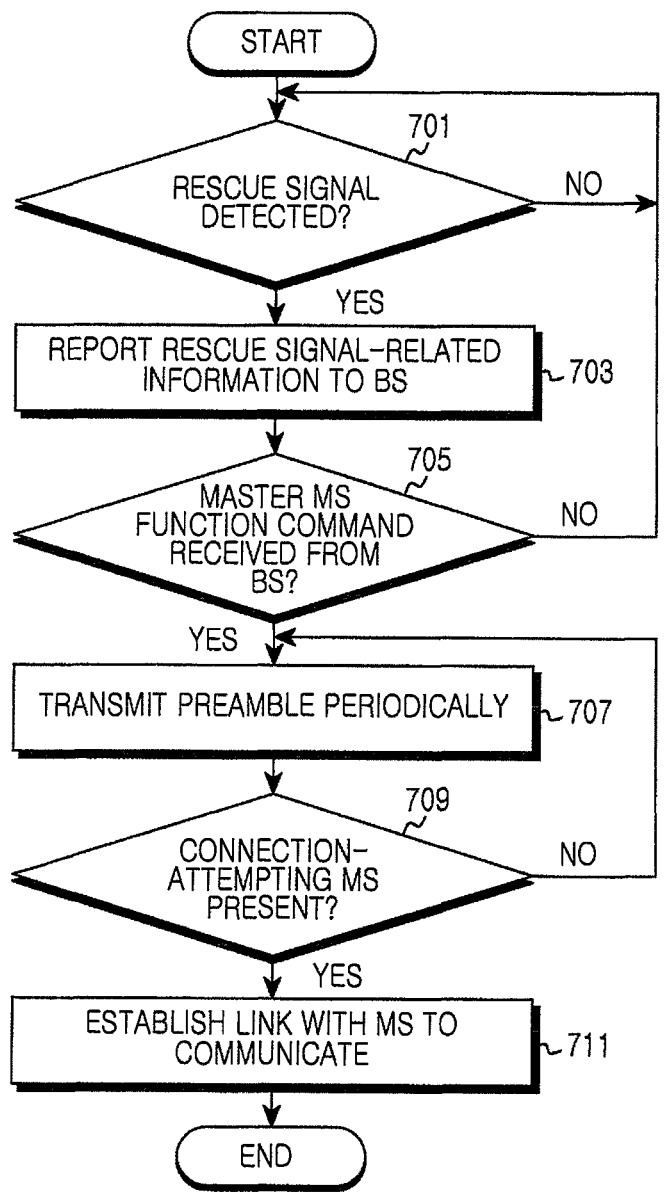
FIG. 7 illustrates an operation process of an MS located in a normal area in a wireless communication system according to another exemplary embodiment of the present disclosure.

FIG. 7 illustrates an operation process of an MS located in a normal area in a wireless communication system according to another exemplary embodiment of the present disclosure.

Referring to FIG. 7, in step 701, the normal MS determines whether a rescue signal is detected. When the rescue signal is detected, the normal MS determines that there is a peripheral MS in a disconnected state. In step 703, the normal MS transmits rescue signal-related information to a serving BS. Herein, the rescue signal-related information may include information about the residual power of the normal MS, information about the reception/non-reception of a rescue signal, information about the number of received rescue signals, information about the strength of a received rescue signal, and information about the location of the normal MS.

In step 705, the normal MS determines whether a master MS function command signal is received from the serving BS. When the master MS function command signal is not received, the normal MS returns to step 701.

On the other hand, when the master MS function command signal is received, the normal MS proceeds to step 707. In step 707, the normal MS enters a master MS mode and transmits a preamble periodically. Herein, the preamble may be allocated from a BS when the master MS function command signal is received. Also, the normal MS may stop an operation of detecting a rescue signal transmitted by a disconnected MS.

In step 709, the normal MS determines whether there is an MS attempting a connection to the normal MS. When there is no MS attempting a connection to the normal MS, the normal MS returns to step 707 to transmit a preamble periodically. Herein, the normal MS performs steps 707 and 709 repetitively. However, when a connection-attempting MS is not present for a predetermined period of time, the normal MS may convert to a general MS mode and transmit a general MS mode conversion signal to the serving BS, without operating as a master MS.

On the other hand, when there is an MS attempting a connection to the normal MS, the normal MS proceeds to step 711. In step 711, the normal MS establishes a communication link with the MS to perform communication. That is, the normal MS may transmit a signal of a disconnected MS, which has connected to the normal MS, to the serving BS, and transmit a signal of the serving BS to the disconnected MS.

Thereafter, the normal MS ends the algorithm according to the present disclosure.

Figure 8:
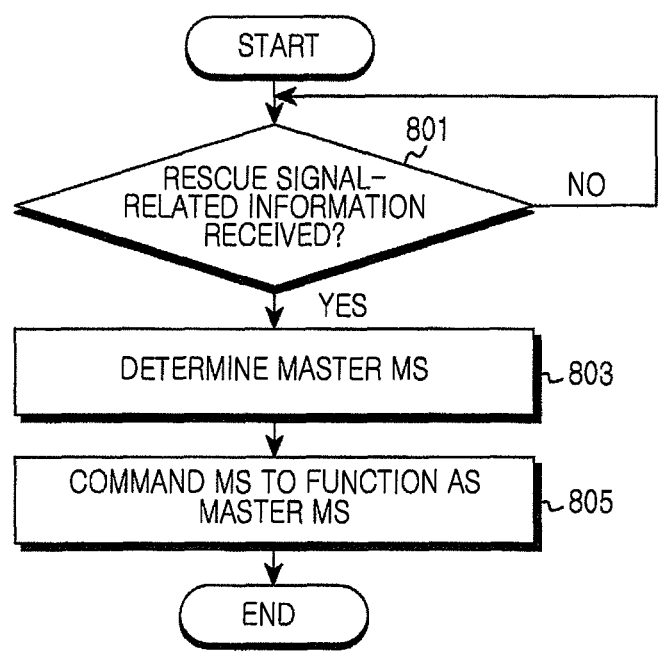
FIG. 8 illustrates an operation process of a BS for supporting an MS disconnected from a BS in a wireless communication system according to another exemplary embodiment of the present disclosure.

FIG. 8 illustrates an operation process of a BS for supporting an MS disconnected from a BS in a wireless communication system according to another exemplary embodiment of the present disclosure.

Referring to FIG. 8, in step 801, the BS determines whether a signal including rescue signal-related information is received. When the rescue signal-related information is received, the BS proceeds to step 803. In step 803, the BS determines a master MS within the BS's cell by using information included in the received signal. Herein, the rescue signal-related information may include information about the residual power of an MS having transmitted the signal, information about the reception/non-reception of a rescue signal, information about the number of received rescue signals, information about the strength of a received rescue signal, and information about the location of the MS. When receiving rescue signal-related information from a plurality of MSs within the BS's cell, the BS uses the received information to select at least one MS suitable for supporting a disconnected MS, among the MSs transmitting the rescue signal-related information, and determines the selected MS as a master MS. For example, first to third MSs having transmitted a signal including rescue signal-related information are located within a threshold distance, the BS may determine the MS among the first to third MSs, from which a rescue signal is most frequently received, as a master MS, or may determine the MS of the greatest residual power as a master MS. The present disclosure is not limited thereto, and the BS may determine a master MS in various ways.

When determining a master MS, the BS may set the maximum number of master MSs. The maximum number of master MSs may be predetermined by a service provider and a designer, or may be changed dynamically according to the cell states. Thus, in step 803, when the number of MSs operating as a master MS is equal to the maximum number of master MSs, the BS may not determine the MS, which has transmitted the rescue signal-related information, as a master MS even when the MS can function as a master MS.

When an MS having transmitted the rescue signal-related information is determined as a master MS, the BS commands the determined MS to function as a master MS, in step 805. Although not illustrated in FIG. 8, when an MS having transmitted the rescue signal-related information is not determined as a master MS, the BS may not transmit any signal or may transmit, to the MS, a signal indicating that the MS is not determined as a master MS.

Thereafter, the BS ends the algorithm according to the present disclosure.

Figure 9:
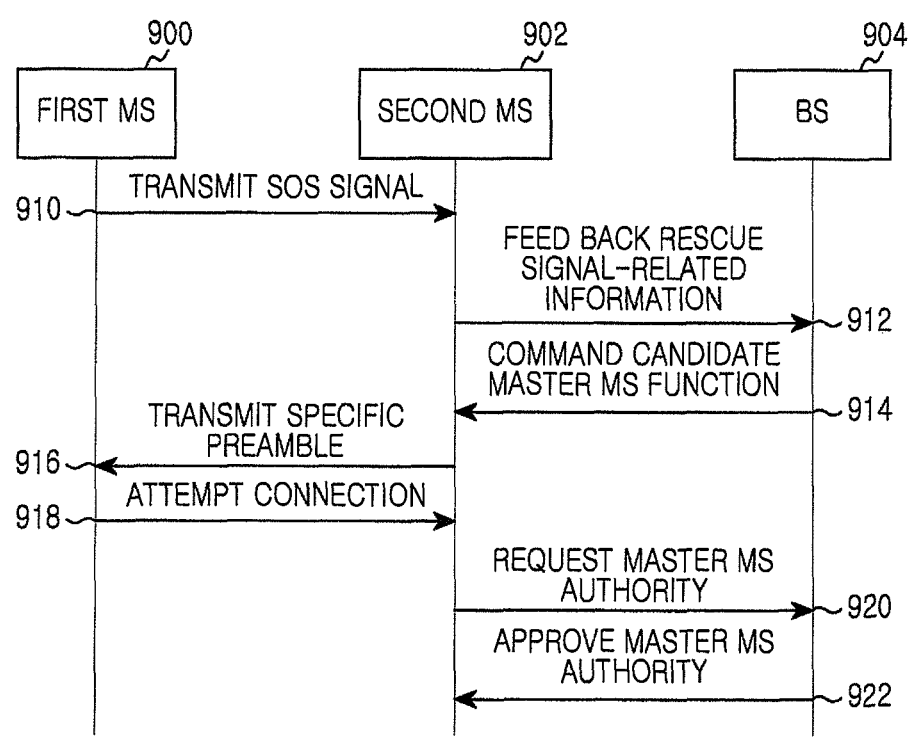
FIG. 9 illustrates a signal flow for supporting an MS disconnected from a BS in a wireless communication system according to another exemplary embodiment of the present disclosure.

FIG. 9 illustrates a signal flow for supporting an MS disconnected from a BS in a wireless communication system according to another exemplary embodiment of the present disclosure. In FIG. 9, a first MS 900 is a disconnected MS that is located in a collapsed cell area to be disconnected from a BS. A second MS 902 is a normal MS that is located in a cell area supporting a normal service. A BS 904 is a serving BS that provides a service to the second MS 902.

Referring to FIG. 9, when a preamble signal is detected, the first MS 900 transmits a rescue signal in step 910. Herein, the preamble signal may be a preamble signal of a BS or a preamble signal of a master MS. When the preamble signal is detected, the first MS 900 attempts a connection to an MS or a BS corresponding to the detected preamble signal, without performing the process of FIG. 9.

Upon receiving the rescue signal, the second MS 902 transmits information related to the rescue signal to the second MS's 902 serving BS 904 in step 912. Herein, the rescue signal-related information may include information about the residual power of the second MS 902, information about the reception/non-reception of a rescue signal, information about the number of received rescue signals, information about the strength of a received rescue signal, and information about the location of the second MS 902.

Upon receiving the rescue signal-related information, the serving BS 904 determines a candidate master MS for disconnected MSs based on the received information. When receiving rescue signal-related information from a plurality of MSs within the serving BS's 904 cell, the serving BS 904 uses the received information to select at least one MS suitable for supporting a disconnected MS, among the MSs transmitting the rescue signal-related information, and determines the selected MS as a candidate master MS. Herein, the serving BS may restrict the number of candidate master MSs, and the maximum number of candidate master MSs may be determined and changed according to the number of master MSs.

When the second MS 902 is determined as a candidate master MS, the serving BS 904 transmits a candidate master MS function command signal to the second MS 902 in step 914. Herein, the serving BS 904 may allocate a preamble to the second MS 904. On the other hand, when the second MS 902 is not determined as a candidate master MS, the serving BS 904 may not transmit any signal or may transmit a signal indicating that the second MS 902 is not determined as a candidate master MS.

In step 916, the second MS 902 transmits the allocated preamble to the first MS 900 at predetermined periods. In this case, the second MS 902 may stop an operation of detecting a rescue signal transmitted by the disconnected MS.

Upon receiving the preamble from the second MS 902, the first MS 900 determines whether to determine the second MS 902 as the first MS's 900 own candidate master MS based on the RX strength of the preamble signal. For example, when the RX strength of the preamble signal received from the second MS 902 is equal to or greater than a predetermined threshold value, the first MS 900 may determine the second MS 902 as the first MS's 900 own candidate master MS. On the other hand, when the RX strength of the preamble signal is smaller than the predetermined threshold value, the first MS 900 may return to step 910 to transmit a rescue signal.

When the first MS 900 determines the second MS 902 as the first MS's 900 own candidate master MS, the first MS 900 attempts a connection to the second MS 902 in step 918. Upon detecting the connection attempt of the first MS 900, the second MS 902 transmits a master MS authority request signal to the serving BS 904 in step 920.

Upon receiving the master MS authority request signal, the serving BS 904 determines whether the number of MSs operating as a master MS in the serving BS's 904 cell is smaller than the maximum number of master MSs. When the number of MSs operating as a master MS in the serving BS's 904 cell is smaller than the maximum number of master MSs, the serving BS 904 determines the second MS 902 as a master MS. In step 922, the serving BS 904 transmits a master MS authority approval signal to the second MS 902. On the other hand, when the number of MSs operating as a master MS in the serving BS's 904 cell is equal to the maximum number of master MSs, the serving BS 904 may disapprove the master MS authority of the second MS 902.

Upon receiving the master MS authority from the serving BS 904, the second MS 902 may establish a communication link with the first MS 900 to transmit a signal of the first MS 900 to the serving BS 904 and to transmit a signal of the serving BS 904 to the first MS 900.

Hereinafter, an operation process of a normal MS and an operation process of a serving BS of the normal MS will be described with reference to FIGS. 10 and 11 based on the signal flow of FIG. 9. An operation of a disconnected MS in FIG. 9 may be performed similarly to the process described in FIG. 3, and thus a description thereof will be omitted for conciseness.

Figure 10:
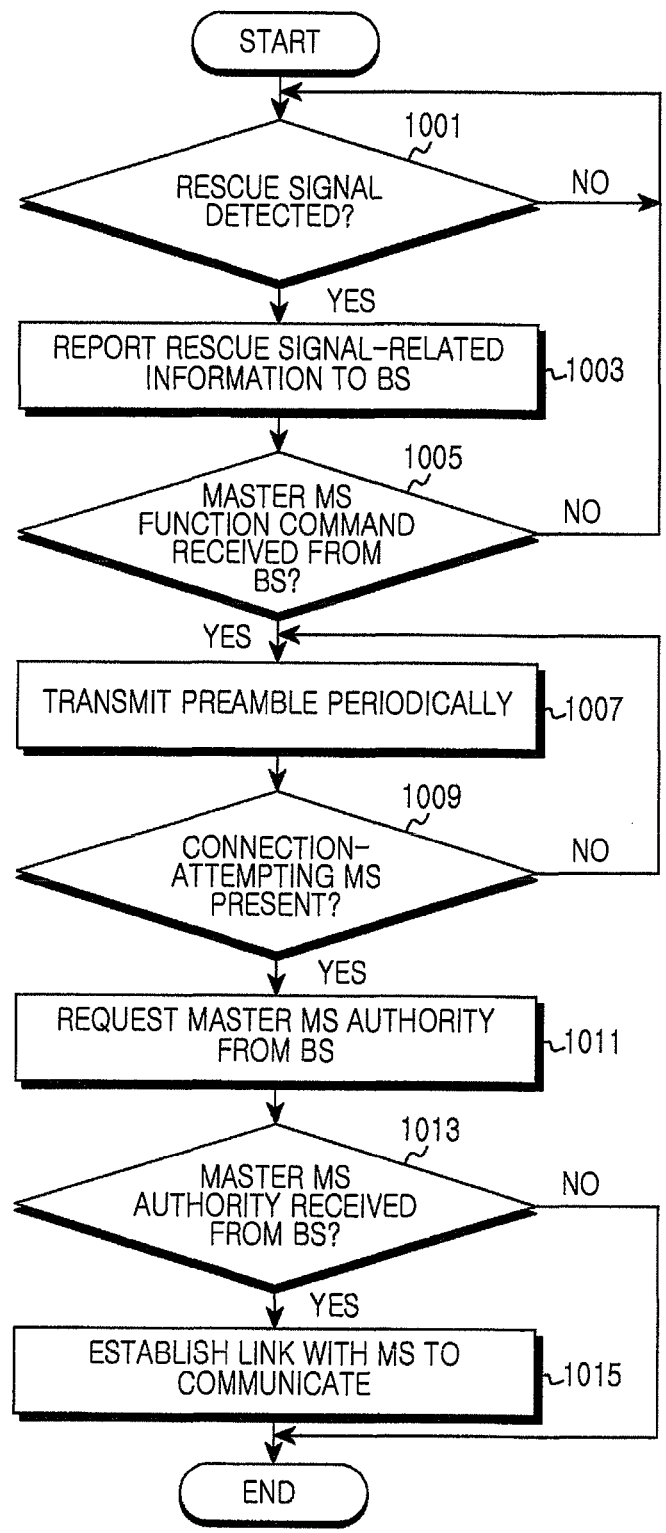
FIG. 10 illustrates an operation process of an MS located in a normal area in a wireless communication system according to another exemplary embodiment of the present disclosure.

FIG. 10 illustrates an operation process of an MS located in a normal area in a wireless communication system according to another exemplary embodiment of the present disclosure.

Referring to FIG. 10, in step 1001, the normal MS determines whether a rescue signal is detected. When the rescue signal is detected, the normal MS determines that there is a peripheral MS in a disconnected state. In step 1003, the normal MS transmits rescue signal-related information to a serving BS. Herein, the rescue signal-related information may include information about the residual power of the normal MS, information about the reception/non-reception of a rescue signal, information about the number of received rescue signals, information about the strength of a received rescue signal, and information about the location of the normal MS.

In step 1005, the normal MS determines whether a candidate master MS function command signal is received from the serving BS. When the candidate master MS function command signal is not received, the normal MS returns to step 1001.

On the other hand, when the candidate master MS function command signal is received, the normal MS proceeds to step 1007. In step 1007, the normal MS enters a candidate master MS mode and transmits a preamble periodically. Herein, the preamble may be allocated from a BS when the candidate master MS function command signal is received. Also, the normal MS may stop an operation of detecting a rescue signal transmitted by a disconnected MS.

In step 1009, the normal MS determines whether there is an MS attempting a connection to the normal MS. When there is no MS attempting a connection to the normal MS, the normal MS returns to step 1007 to transmit a preamble periodically. Herein, the normal MS performs steps 1007 and 1009 repetitively. However, when a connection-attempting MS is not present for a predetermined period of time, the normal MS may convert to a general MS mode and transmit a general MS mode conversion signal to the serving BS, without operating as a master MS.

On the other hand, when there is an MS attempting a connection to the normal MS, the normal MS proceeds to step 1011. In step 1011, the normal MS transmits a master MS authority request signal to the serving BS. In step 1013, the normal MS determines whether a master MS authority approval signal from the serving BS. When a master MS authority disapproval signal is received from the serving BS, or when no signal is received for a predetermined period of time, the normal MS ends the algorithm according to the present disclosure.

On the other hand, when the master MS authority approval signal is received from the serving BS, the normal MS proceeds to step 1015. In step 1015, the normal MS establishes a communication link with the relevant MS to perform communication. That is, the normal MS may transmit a signal of a disconnected MS, which has connected to the normal MS, to the serving BS, and transmit a signal of the serving BS to the disconnected MS.

Thereafter, the normal MS ends the algorithm according to the present disclosure.

Figure 11:
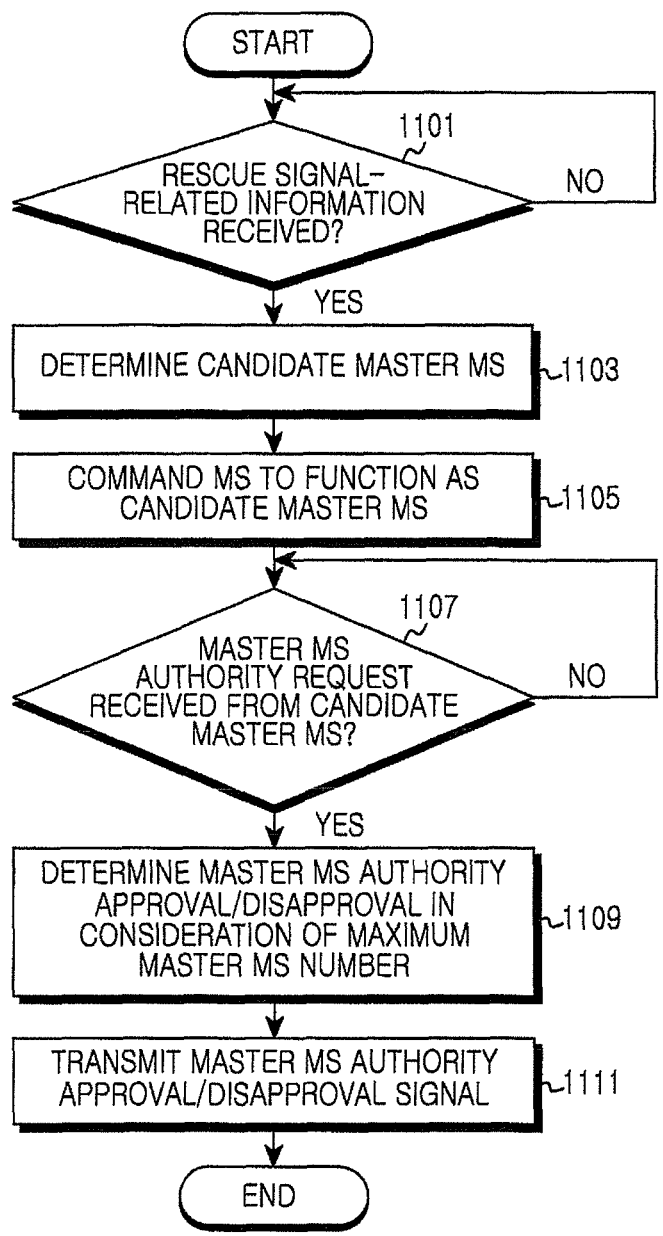
FIG. 11 illustrates an operation process of a BS for supporting an MS disconnected from a BS in a wireless communication system according to another exemplary embodiment of the present disclosure.

FIG. 11 illustrates an operation process of a BS for supporting an MS disconnected from a BS in a wireless communication system according to another exemplary embodiment of the present disclosure.

Referring to FIG. 11, in step 1101, the BS determines whether a signal including rescue signal-related information is received. When the rescue signal-related information is received, the BS proceeds to step 1103. In step 1103, the BS determines a candidate master MS within the BS's cell by using information included in the received signal. Herein, the rescue signal-related information may include information about the residual power of an MS having transmitted the signal, information about the reception/non-reception of a rescue signal, information about the number of received rescue signals, information about the strength of a received rescue signal, and information about the location of the MS. When receiving rescue signal-related information from a plurality of MSs within the BS's cell, the BS uses the received information to select at least one MS suitable for supporting a disconnected MS, among the MSs transmitting the rescue signal-related information, and determines the selected MS as a candidate master MS. For example, first to third MSs having transmitted a signal including rescue signal-related information are located within a threshold distance, the BS may determine the first MS, from which a rescue signal is received most frequently, and the third MS, from which a rescue signal is received second-most frequently, as candidate master MSs, or may determine the MS of the greatest residual power and the MS of the second-greatest residual power as candidate master MSs. The present disclosure is not limited thereto, and the BS may determine a candidate master MS in various ways.

When determining the candidate master MS, the BS may set the maximum number of candidate master MSs. The maximum number of candidate master MSs may be predetermined by a service provider and a designer, or may vary be changed dynamically according to the cell states. Thus, in step 1103, when the number of MSs operating as a candidate master MS is equal to the maximum number of candidate master MSs, the BS may not determine an MS, which has transmitted the rescue signal-related information, as a candidate master MS even when the MS can function as a candidate master MS.

When an MS having transmitted the rescue signal-related information is determined as a candidate master MS, the BS proceeds to step 1105. In step 1105, the Bs commands the determined MS to function as a candidate master MS. Although not illustrated in FIG. 11, when an MS having transmitted the rescue signal-related information is not determined as a candidate master MS, the BS may not transmit any signal or may transmit, to the MS, a signal indicating that the MS is not determined as a candidate master MS.

In step 1107, the BS determines whether a master MS authority request signal is received from a candidate master MS.

When a master MS authority request signal is received from the candidate master MS, the BS proceeds to step 1109. In step 1109, in consideration of the maximum number of master MSs, the BS determines whether to approve the master MS authority of the candidate master MS. That is, when the number of MSs operating as a master MS in the BS's cell area is smaller than the maximum number of master MSs, the BS may approve the master MS authority of the candidate master MS. On the other hand, when the number of MSs operating as a master MS in the BS's cell area is equal to the maximum number of master MSs, the BS may disapprove the master MS authority of the candidate master MS.

In step 1111, the BS transmits a master MS authority approval/disapproval signal to the candidate master MS. When the candidate master MS is not determined as a master MS, the BS may not transmit any signal.

Thereafter, the BS ends the algorithm according to the present disclosure.

Figure 12:
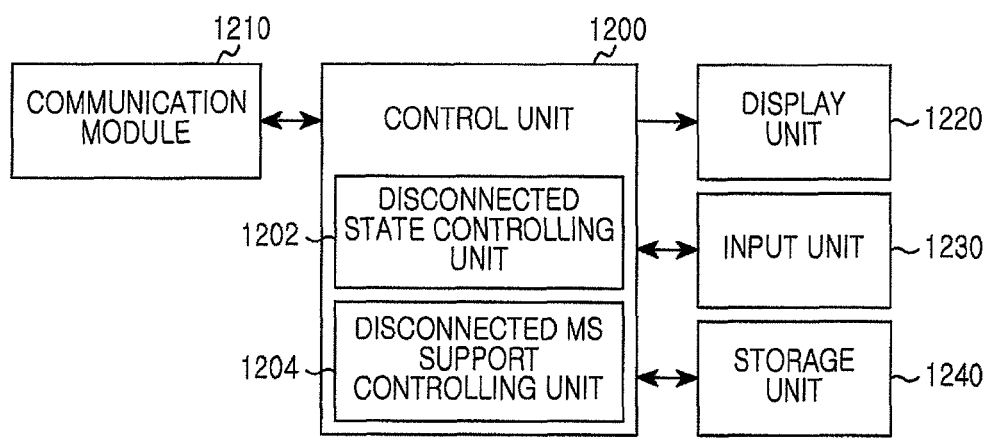
FIG. 12 illustrates a MS in a wireless communication system according to an exemplary embodiment of the present disclosure.

FIG. 12 illustrates a MS in a wireless communication system according to an exemplary embodiment of the present disclosure.

Referring to FIG. 12, the MS may include a control unit 1200, a communication module 1210, a display unit 1220, an input unit 1230, and a storage unit 1240. The control unit 1200 may include a disconnected state controlling unit 1202 and a disconnected MS support controlling unit 1204.

The control unit 1200 controls and processes an overall operation of the MS. According to the present disclosure, the control unit 1200 controls the disconnected state controlling unit 1202 to detect a disconnected state, in which the MS is located in a collapsed cell area or is located outside a cell area to be unable to receive a communication service from a BS, and to transmit a rescue signal to receive a communication service through an MS located in a normal cell area. That is, when a preamble signal transmitted from a peripheral BS or MS is not detected, the disconnected state controlling unit 1202 may determine that the MS is in a disconnected state. In this case, the disconnected state controlling unit 1202 controls the communication module 1210 to transmit a predetermined rescue signal. When detecting a preamble signal, which is transmitted from a MS located in a normal cell area, through the communication module 1210, the disconnected state controlling unit 1202 determines a master MS based on the RX strength of the preamble signal and connects to the master MS.

Also, the control unit 1200 controls the disconnected MS support controlling unit 1204 to support MSs that are in a disconnected state. When a rescue signal is received through the communication module 1210, the disconnected MS support controlling unit 1204 transmits a master MS authority request signal or rescue signal-related information to a serving BS. Herein, the rescue signal-related information may include information about the residual power of the MS, information about the reception/non-reception of a rescue signal, information about the number of received rescue signals, information about the strength of a received rescue signal, and information about the location of the MS. When a master MS authority approval signal or a candidate master MS authority approval signal is received from the serving BS, the disconnected MS support controlling unit 1204 detects a preamble allocated from the serving BS and transmits the allocated preamble periodically. When there is a disconnected MS attempting to a connection to the MS, the disconnected MS support controlling unit 1204 directly establishes a communication link with the disconnected MS according to the master MS authority approval of the serving BS or transmits a master MS authority request signal to the serving BS.

The communication module 1210 includes a transmitting unit (not illustrated) for transmitting signals and a receiving unit (not illustrated) for receiving signals. The communication module 1210 transmits signals under the control of the control unit 1200. Under the control of the control unit 1200, the communication module 1210 may transmit a rescue signal when the MS is in a disconnected state. Also, under the control of the control unit 1200, the communication module 1210 periodically transmits a preamble allocated from a serving BS, transmits a master MS authority request signal to the serving BS, and receives a master MS authority approval signal from the serving BS.

The display unit 1220 displays numerals, characters, images, and status information generated during an operation of the MS. The input unit 1230 includes one or more function keys or touch sensors. The input unit 1230 provides the control unit 1200 with data corresponding to a user's touch or data corresponding to a key pressed by the user. The storage unit 1240 stores various programs and data for an overall operation of the MS.

Figure 13:
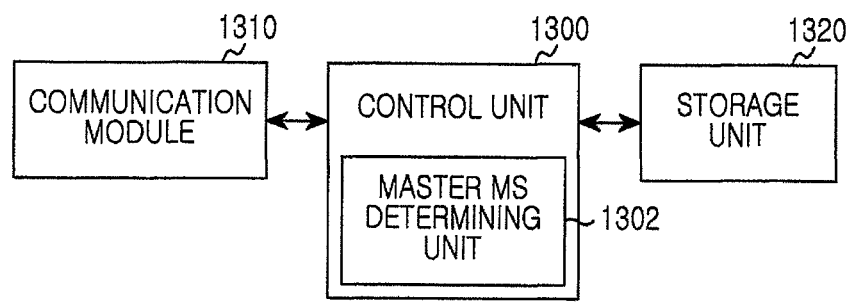
FIG. 13 illustrates a BS in a wireless communication system according to an exemplary embodiment of the present disclosure.

FIG. 13 illustrates a BS in a wireless communication system according to an exemplary embodiment of the present disclosure.

Referring to FIG. 13, the BS may include a control unit 1300, a communication module 1310, and a storage unit 1320. The control unit 1300 may include a master MS determining unit 1302.

The control unit 1300 controls and processes an overall operation of the BS. According to the present disclosure, the control unit 1300 includes the master MS determining unit 1302 to determine an MS, which is located in a cell of the BS, as a master MS to support a disconnected MS. That is, when rescue signal-related information is received from MSs located in the cell, the master MS determining unit 1302 may determine a candidate master MS or a master MS based on the rescue signal-related information. Herein, the master MS determining unit 1302 determines a master MS so that the number of master MSs in the cell does not exceed the maximum number of master MSs. Herein, the rescue signal-related information may include information about the residual power of a relevant MS, information about the reception/non-reception of a rescue signal, information about the number of received rescue signals, information about the strength of a received rescue signal, and information about the location of the MS. Also, the maximum number of master MSs may be predetermined by a service provider and a designer, or may be changed according to the cell states. Also, the master MS determining unit 1302 allocates a preamble to a master MS or a candidate master MS and transmits the allocated preamble. Also, when a master MS authority request signal is received from a candidate master MS, the master MS determining unit 1302 may compare the number of master MSs in the cell with the maximum number of master MSs and determine whether to approve the master MS authority of the candidate master MS.

The communication module 1310 includes a transmitting unit (not illustrated) for transmitting signals and a receiving unit (not illustrated) for receiving signals. The communication module 1310 communicates signals with MSs in the cell under the control of the control unit 1300. Under the control of the control unit 1300, the communication module 1210 receives a master MS authority request signal and a signal including rescue signal-related information from MSs in the cell and transmits a master MS authority approval signal to a relevant MS.

The storage unit 1320 stores various programs and data for an overall operation of the BS. According to the present disclosure, the storage unit 1320 stores the maximum number of master MSs and the number of MSs operating as a master MS in the cell.

As described above, according to the present disclosure, a normal MS located in a normal cell area in a wireless communication system detects a rescue signal of a disconnected MS located in a collapsed cell area to be disconnected from a BS, and operates as a master MS for the disconnected MS to connect the disconnected MS and the BS, thereby making it possible to support an emergency call service for the disconnected MS. Also, when the disconnected MS determines its own master MS, it is possible to select a master MS having an excellent downlink channel environment. When a BS determines a master MS for the disconnected MS, it is possible to perform efficient communication by controlling the number of master MSs in a cell area of the BS.

While the disclosure has been, shown and described with reference to certain exemplary embodiments thereof, it will be understood by those skilled in the art that various changes in form and details may be made therein without departing from the spirit and scope of the disclosure as defined by the appended claims. Therefore, the scope of the disclosure is defined not by the detailed description of the disclosure but by the appended claims, and all differences within the scope will be construed as being included in the present disclosure.

What is claimed is:

1. A method for operating a mobile station (MS) included in a cell of a second base station (BS) in a wireless communication system, the method comprising:
receiving, from another MS included in a cell of a first BS, a first signal indicating that a first preamble used for establishing a first communication link with the first BS is not detected by the another MS;
transmitting, to the second BS, a second signal for requesting allocating a preamble to the MS in response to receiving the first signal, wherein the second signal comprises at least one of information about a residual power of the MS, information about a number of the received first signals, information about a strength of the received first signal, and information about a location of the MS;
receiving, from the second BS, a third signal comprising information regarding a second preamble allocated to the MS;
transmitting, to the another MS, the second preamble; and
in response to receiving a request signal for a second communication link between the MS and the another MS from the another MS, transmitting, to the second BS, a fourth signal for requesting an authority for establishing the second communication link after receiving the request signal;
receiving, from the second BS, a fifth signal for indicating an approval of the authority; and
establishing the second communication link with the another MS after receiving the fifth signal,
wherein whether the request signal is transmitted or not is determined, by the another MS, based on a signal strength of the second preamble.

2. An apparatus of a mobile station (MS) included in a cell of a second base station (BS) in a wireless communication system, the apparatus comprising:
a transceiver; and
at least one processor configured to control the transceiver to:
receive, from another MS included in a cell of a first BS, a first signal indicating that a first preamble used or establishing a first communication link with the first BS is not detected by the another MS;
transmit, to the second BS, a second signal for requesting allocating a preamble to the MS in response to receiving the first signal, wherein the second signal comprises at least one of information about a residual power of the MS, information about a number of the received first signals, information about a strength of the received first signal, and information about a location of the MS;
receive, from the second BS, a third signal comprising information regarding a second preamble allocated to the MS;
transmit, to the another MS, the second preamble; and
transmit, to the second BS, a fourth signal for requesting an authority for establishing a second communication link between the MS and the another MS in response to receiving a request signal for the second communication link from the another MS;
receive, from the second BS, a fifth signal for indicating an approval of the authority; and
establish the second communication link with the another MS after receiving the fifth signal,
wherein whether the request signal is transmitted or not is determined, by the another MS, based on a signal strength of the second preamble.

* * * * *